(12) United States Patent
Smith

(10) Patent No.: US 6,417,863 B1
(45) Date of Patent: Jul. 9, 2002

(54) COLOR BALANCING A MULTICOLOR DISPLAY

(75) Inventor: Ronald D. Smith, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/639,631

(22) Filed: Aug. 15, 2000

Related U.S. Application Data

(63) Continuation-in-part of application No. 09/318,452, filed on May 25, 1999, and a continuation-in-part of application No. 09/301,182, filed on May 28, 1999, now Pat. No. 6,144,162.

(51) Int. Cl.[7] .................................................. G09G 5/02
(52) U.S. Cl. ........................ 345/590; 345/591; 348/223
(58) Field of Search ............................ 345/150, 72, 22, 345/83, 431, 589, 590, 605, 591, 592, 593, 597, 604, 600, 603, 601; 348/223, 224, 225, 655; 399/39; 356/404; 355/35

(56) References Cited

U.S. PATENT DOCUMENTS

| | | | |
|---|---|---|---|
| RE29,085 E | * 12/1976 | Yost, Jr. ........................ 354/68 |
| 4,458,002 A | * 7/1984 | Janssens et al. ............. 430/236 |
| 4,483,916 A | * 11/1984 | Thiers ........................... 430/236 |
| 4,751,535 A | * 6/1988 | Myers ........................... 346/157 |
| 4,917,465 A | * 4/1990 | Conner et al. ................... 349/5 |
| 4,966,441 A | * 10/1990 | Conner ........................... 349/80 |
| 5,231,504 A | * 7/1993 | Magee ........................... 358/75 |
| 5,450,216 A | * 9/1995 | Kasson ........................... 358/518 |
| 5,747,928 A | 5/1998 | Shanks et al. |
| 5,777,603 A | * 7/1998 | Jaeger ........................... 345/184 |
| 5,793,221 A | * 8/1998 | Aoki ............................ 324/770 |
| 5,821,688 A | 10/1998 | Shanks et al. |
| 5,821,690 A | 10/1998 | Martens et al. |
| 5,828,427 A | * 10/1998 | Faris ............................ 349/86 |
| 5,870,162 A | * 2/1999 | Fujimori et al. ............. 349/143 |
| 5,909,248 A | * 6/1999 | Stephenson .................. 348/373 |
| 5,910,796 A | 6/1999 | Gormish |
| 5,926,617 A | 7/1999 | Ohara et al. |
| 5,936,608 A | * 8/1999 | Springer .................... 315/169.3 |
| 5,940,156 A | * 8/1999 | Nishiguchi et al. ........... 349/86 |
| 5,965,901 A | 10/1999 | Heeks et al. |
| 5,977,718 A | 11/1999 | Christensen |
| RE36,654 E | * 4/2000 | Conner et al. .................. 349/6 |

OTHER PUBLICATIONS

U.S. application No. 09/301,182, Smith, filed Apr. 28, 1999.
U.S. application No. 09/318,452, Smith, filed May 25, 1999.

* cited by examiner

Primary Examiner—Matthew Luu
Assistant Examiner—Thu-Thao Havan
(74) Attorney, Agent, or Firm—Michael J. Willardson

(57) ABSTRACT

Numerous embodiments of a method of adjusting the color balance of a display are disclosed. in one embodiment, the color balance of a display is adjusted by modulating two selected colors so that at some point during the modulation the two colors appear substantially the same an the display, and the modulation is adjusted to change the point at which the colors appear substantially the same. The color balance of the display is modified based, at least in part, on a measurement of the modulation adjustment. In another embodiment of a method of adjusting the color balance of a display, the luminance and/or chromaticity of a color from the color space of the display is modified, and luminance and/or chromaticity of a color from a reference color space is modulated, where the applied modulation over time of the two colors are mirror images with respect to each other. The modulation is adjusted so that the colors appear substantially the same at a selected point during the modulation of both colors, and the color balance of the display is modified based, at least in part, on a measurement of the modulation adjustment.

27 Claims, 3 Drawing Sheets

COLOR BALANCING A MULTICOLOR DISPLAY

RELATED APPLICATIONS

This patent application is a continuation-in-part of U.S. patent application Ser. No. 09/318,452, filed on May 25, 1999, titled, "Performing Color Conversion in Extended Color Polymer Displays," by Ronald D. Smith, and of U.S. patent application Ser. No. 09/301,182, filed on May 28, 1999 now U.S. Pat. No. 6,144,162 titled, "Controlling Polymer Displays," by Ronald D. Smith, both assigned to the assignee of the present invention, and herein incorporated by reference.

BACKGROUND

The present disclosure is related to multicolor displays and, more particularly, to color balancing a multicolor display.

Although typically displays, such as for a computer or other platform, employ three colors to span the color space produced by the display, such as the Red-Green-Blue (RGB) color space, more than three colors may be employed. In some situations, this may be desirable for some multicolor displays, such as emissive polymer displays, to, for example, reduce power dissipation, as described, for example, in aforementioned U.S. patent application Ser. Nos. 09/318, 452 (attorney docket No. 042390.7140) and 09/301,182 (attorney docket No. 042390.7005). However, such approaches may also introduce some complexities to address. For example, if an emissive polymer display employs five colors, for example, to span the desired color space, improper color balancing may produce color artifacts and/or other anomalies that may be detectable by the human eye and, therefore, undesirable. Typically, precision measuring instruments may be used at the factory to color balance the display prior to shipment; however, output drift and/or other characteristics of the display hardware employed may result in improper color balancing, even after precision balancing has occurred. A need, therefore, exists for a technique for performing color balancing of a multicolor display outside the factory environment.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As previously indicated, in a variety of situations, it may be desirable to have a technique for color balancing a multicolor display outside of the factory environment and without using high precision instruments that measure light and/or light related characteristics, etc. In particular, although the scope of the invention is not limited to a specific situation, for emissive polymer displays, such displays may be limited by specific spectral characteristics associated with the polymers employed. In this context, the term emissive polymer display refers to a display that includes a cell or pixel location such that electromagnetic radiation is emitted by the display from at least that cell or pixel location and the cell or pixel in that location is manufactured at least in part from one or more polymer materials. Of course, typically, such a display will include many such cells or pixels.

As alluded to above, such polymer emitters or emitter cells may vary in energy utilization or consumption. Therefore, it may be desirable, in some circumstances, to employ more than three color emitters to span a color space, although three colors may be sufficient to represent the desired range of colors for the display. Using more than three colors may, in some circumstances, reduce energy utilization. For example, substantially the same color may be produced by combining different emitters that use less energy where more than three color emitters are employed.

Of course, a disadvantage of this approach may include greater complexity. For example, color balancing, for example, five emitters, may be more difficult than balancing three. As indicated previously, such color balancing is typically performed at the factory using precision measuring instruments, such as photometers, etc. However, another complexity is that even after balancing or calibration, the emitters may drift making color balancing or rebalancing at a later time also desirable.

Figure 1:
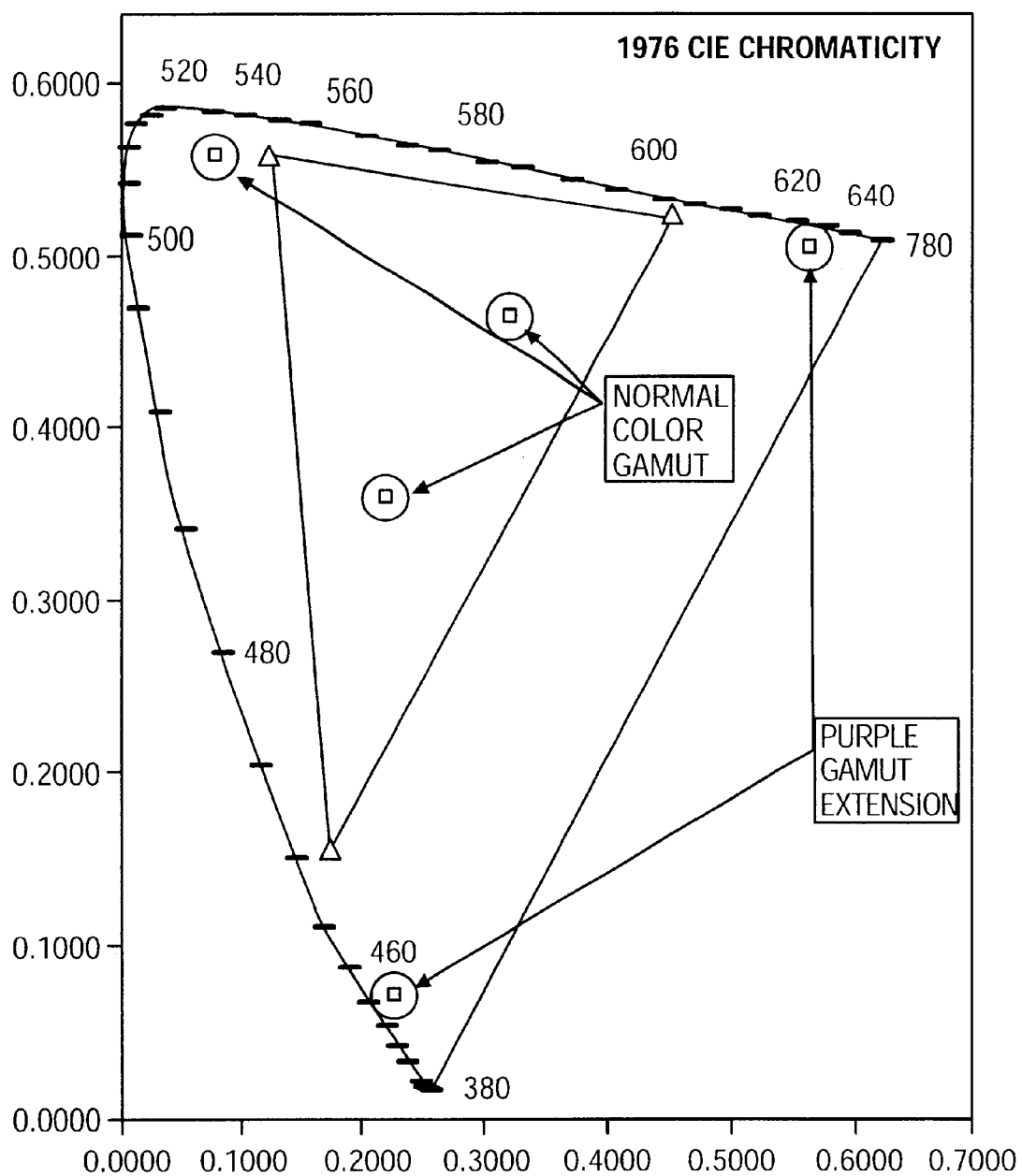
FIG. 1 is a two-dimensional plot of the 1976 Commission Internationale de L'Eclairage (CIE) color space on a chromaticity diagram.

To illustrate this more concretely, FIG. 1 is a plot of the 1976 CIE color space on a chromaticity diagram, which is a two-dimensional diagram representing human sensitivities. The outer line shown is a line defined by monochromatic light sources varying between 380 and 780 nanometers. Colors do not exist outside this line, by definition. Likewise, towards the right and bottom of the diagram is the "Line of Purples." Purple is a color composed of both red and blue, represented at extremes of visible wavelengths. As the source of illumination is composed of deeper reds (eg, longer wavelengths) and deeper violets (eg, shorter wavelengths), rather than an abrupt edge to the color space, as with the monochromatic line, instead a drop off in the sensitivity of the human eye occurs.

In FIG. 1, five locations are chosen to represent the color coordinates for five polymer emitters. Here, that is, in this particular example, the selected colors are: light red, light blue, deep red, deep blue, and green. It is, of course, understood that the locations are provided merely as one example for illustrative purposes. The actual locations will depend, for example, at least in part, on the particular polymers. It is not intended that this example be taken as limiting in any way or be interpreted as anything other than an example of an approach that might be employed by one potential embodiment in accordance with the invention.

Therefore, the invention is not dependent in any way on the particular choice of emissive polymers, colors, or energy efficiency. Any and all such possibilities are within the scope of the present invention.

Figure 2:
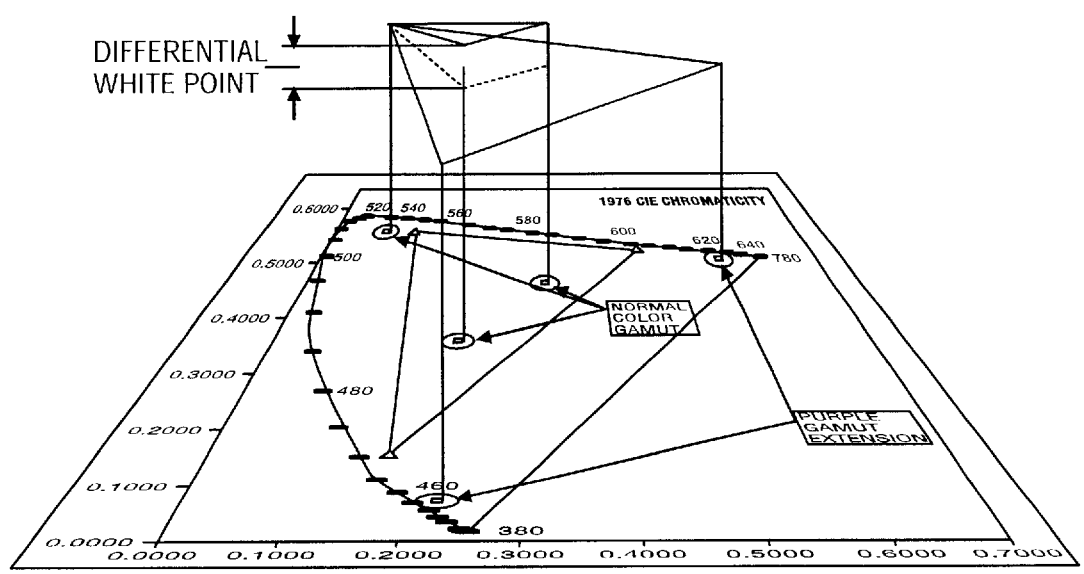
FIG. 2 is a perspective view of a three-dimensional plot of chromaticity and intensity schematically illustrating an example of improper color balancing for a multicolor display employing five colors.

Referring now to FIG. 2, a perspective view of a three-dimensional plot of chromaticity and intensity schematically illustrates an example of improper color balancing or the color balancing issue for a multicolor display employing five colors, although, of course, the invention is not limited in scope to employing only five colors. A fewer or a greater number of colors may, of course, be employed in alternative embodiments in accordance with the invention. In this perspective plot, the vertical axis positioned perpendicular to the plane that includes the chromaticity diagram represents intensity or luminance.

FIG. 2 may be interpreted to illustrate at least two potential issues for a multicolor display. One issue is whether a color plane of the display representing a non-zero intensity level is parallel to the CIE chromaticity diagram. For example, the plane may, instead, be tilted towards red or green. If the plane is tilted, this may affect the white point of the color plane and, therefore, a color shift may be perceived as a result. During calibration of the display, the red, green, and/or blue gain may be modified to produce a 'correct' white point, that is, one that may not result in a perceived color shift to someone viewing the display. This would have the effect of making the plane effectively parallel to the CIE chromaticity diagram. In this context, the white point refers to a location on the chromaticity diagram corresponding to the color produced by a so called 'black body' at a particular temperature referred to as the color temperature. For example, the sun provides a white point or white light equivalent to a black body color temperature of 6600 degrees Kelvin (K), and this is often employed as a standard. However, displays may, and sometimes are, set at a white point corresponding to a color temperature other than 6600 K, such as to a temperature as high as 9600 K in some instances, for example.

Another issue illustrated in FIG. 2 is to have the selected colors employed to span the color space be 'critically planar.' As is well-known, three points define a plane in three-dimensional space. However, where more than three points are employed to span a color space, as in this example, the additional points beyond three may not lie in the plane formed by the selected three points. This is illustrated in FIG. 2 where three points form one plane, and then the added two points in the extended color space form another plane. The plane formed by the central triangle is in balance, whereas the plane formed by the points in the extended color space are not. The figure also illustrates the differential white point as the difference in the tilt of the two planes.

Lack of balance in this example in FIG. 2 is magnified by the difference in tilt between the two planes. As a transition occurs between color spaces when employed to produce colors on the display, a sudden jump or change in color is perceived. For objects or images where the color transition is smooth, this may be manifested as a spatial artifact, such as contouring, which, for example, humans perceive to be annoying typically. It is noted that this artifact in this example will include luminance and chromaticity components, and the human eye is particularly sensitive to luminance shifts.

The foregoing are two separate considerations that may be addressed independently. For example, in one embodiment of the invention, the five points may be made co-planar or critically planar without adjusting the tilt. Likewise, in another embodiment, the five points may be made co-planar or critically planar, and the tilt of the co-planar points may be adjusted. The invention is not limited in scope to a particular approach or order to performing these adjustments, although, in some embodiments, adjusting the tilt may involve a complex calibration procedure, making it desirable, in at least some circumstances, to perform the former adjustment before the later adjustment.

One potential embodiment of a method of adjusting the color balance of a multicolor emissive display may, therefore, include the following. Two selected colors may be modulated so that at some point during the modulation the two colors appear substantially the same on the display. The modulation that is applied may then be adjusted to change the point at which the colors appear substantially the same. Then, based, at least in part, on a measurement of the modulation adjustment, the color balance of the display may be modified.

Of course, as is well-known, color adjustments are difficult to make by trained observers, let alone by anyone who is a user of such a display system. One way to enhance the ability to judge color may be to induce artificial motion. Inducing artificial motion to the display may, at least in theory, encourage the use of brain pathways that have improved sensitivity, increasing the reliability of the result. Employing artificial motion may encourage this to occur because experiments indicate that the human visual system is much more sensitive to motion than to absolute position. For example, experiments have been made where observers were able to correctly detect the direction of motion, even though they could not determine what was moving. By inducing motion, the observer may become much more sensitive to the outcome, improving their apparent skills at making a determination.

Figure 3:
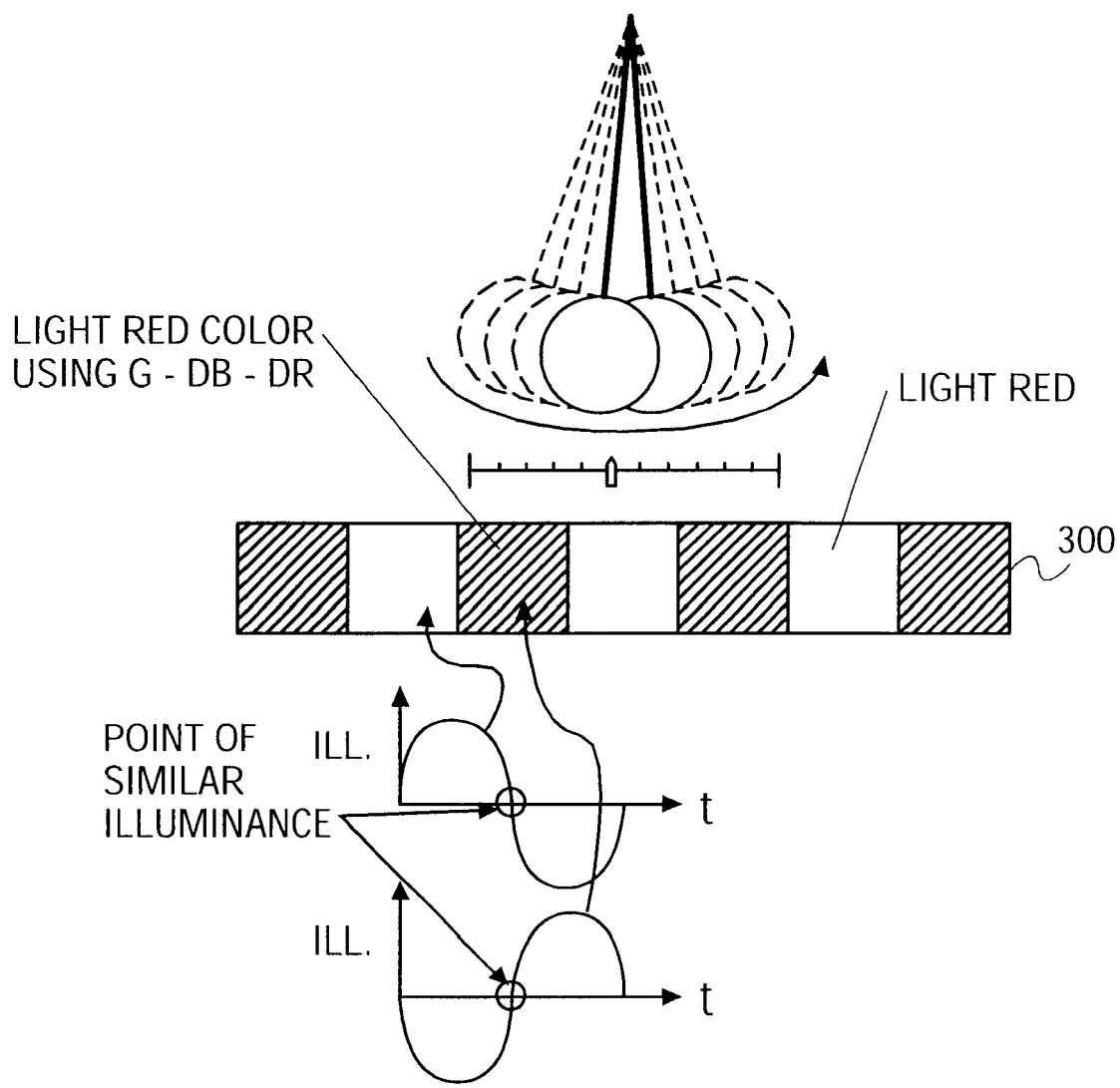
FIG. 3 is a schematic diagram illustrating an embodiment of a graphical interface (GI) that may be employed to implement an embodiment of a method of color balancing a multicolor display in accordance with the present invention.

For example, referring to FIG. 3, although, of course, the invention is not limited in scope to this particular graphic interface, a user may be presented with a bar of color 300, divided into regularly space regions, as illustrated. These regions may be modulated. In particular, here, the luminance of the regions may be modulated, although the invention is not limited in scope in this respect. In alternative embodiments, for example, the luminance and/or chromaticity of the regions may be modulated. Again, in this example, the even regions may comprise, prior to modulation, a color or colors selected from the color space of the display, such as light red. Likewise, the odd regions may comprise, prior to modulation, a color or colors selected from a reference color space, such as the Green-Deep Red-Deep Blue color space, previously described, to also implement light red. Again, the invention is not restricted in scope to employing a bar of color or employing alternate even and odd color regions from the respective color spaces. Many other approaches to displaying the selected colors to be modulated may be employed. In this particular example, however, the luminance of these regions may now be modulated so that at some point during the modulation the colors look substantially the same. As one example, if sinusoidal modulation is applied, as illustrated graphically in FIG. 3, where the modulation of the odd and even regions are 180 degrees out of phase, for example, at some point, the colors will appear substantially the same.

Along with a bar of color, as illustrated in FIG. 3, a moving pendulum may be provided, although, again, the invention is not limited in scope in this respect. In other embodiments other graphics may be employed, or a graphic such as this may be omitted entirely. In this embodiment, however, the pendulum may swing back and forth, such as at a rate of one traversal per second, although, again, the invention is not limited in scope, for example, to a particular traversal rate. In this particular embodiment, however, the pendulum is modeled after the non-linear swing of an actual pendulum so that its velocity is highest at the mid-position or null point. In this embodiment, the video sequence, however, will not illustrate this position so that the user may interpolate that position based on the motion of the graphic, although, again, these are details of this embodiment that may be omitted in alternative embodiments.

As previously indicated, at some point during the modulation, the colors should look or appear substantially the same. The user, using in this example, a sliding bar, although the invention is not limited in scope to a sliding bar, may adjust the modulation to change the point at which the colors appear substantially the same. More specifically, moving the bar may impact the display so that it changes the phase of the modulation by changing the color balance between the two color space planes. For example, in one approach, although again the invention is not limited in scope in this respect, the user may deliberately adjust the modulation so that the colors appear substantially the same at approximately the mid-position of the pendulum swing.

A measure of this modulation adjustment, then, provides a measure of the differential between the two color planes, here, a color plane of the color space display and a color plane of a reference color space. It is desirable to then use this measurement to make adjustments to the display so that the color plane of the color space of the display is in alignment or substantially co-planar with the color plane of the reference color space. Although the invention is not limited in scope in this respect, this may be accomplished, in this example, by adjusting the Red, Green, and Blue gains of the display. For example, software may make adjustments to registers that control these gains, assuming that is the appropriate approach to employ to affect the gain of the color. Of course, any one of a number of techniques for implementing this color balancing adjustment may be employed and the invention is not restricted in scope to a particular approach.

In another embodiment, the precision of the measurement may be improved by, in addition, changing the colors employed, obtaining another or second measurement, such as by the technique previously described, and combining the two measurements to make the appropriate gain adjustments for the display. Of course, the invention is not limited in scope to obtaining a particular number of measurements, such as only one measurement or only two measurements, as well. Such additional measurements may in some instances improve the granularity or precision of the measurements employed to balance the colors of the display, although, for a variety of reasons, such as reduced complexity and time, it may be desirable to omit such an approach in some embodiments.

In yet another embodiment of the invention, a method of adjusting the color balance of a multicolor emissive display may include the following. The luminance and/or chromaticity of a color from the color space of the display may be modulated. The luminance and/or chromaticity of a color from a reference color space may also be modulated; however, the applied luminance modulation over time of the two colors may be essentially mirror images with respect to each other, so that, at some point, the two colors should appear substantially the same. The modulation may then be adjusted in a manner so that the colors again appear substantially the same at a selected point during the modulation of both colors, however, at a point typically different than the point where they appeared substantially the same prior to adjustment of the applied modulation. Then, the color balance of the display may be modified based, at least in part, on a measurement of the modulation adjustment. Although the invention is not limited in scope in this respect, the reference color space may comprise the 1976 CIE color space, or, alternatively, a color shifted version of the 1976 CIE color space. Of course, any one of a number of color spaces may be employed and the invention is not restricted to a particular one. The 1976 CIE color space effectively completely covers the gamut of human vision, although a color space with a smaller gamut may also be employed in an alternative embodiment. Likewise, in a particular embodiment, the modulation applied may be periodic, such as, for example, sinusoidal, although the invention is not restricted in scope to being either periodic or sinusoidal. In addition, it may be desirable to have the point at which the colors appear substantially the same be a convenient one, such as at the midpoint of the modulation, which may be determined any one of a number of ways. For example, in a previously discussed embodiment, a swinging pendulum was employed, although, of course, this is just one example of a possible technique. Again, although it may be desirable to select the colors from the extended color space, the invention is not limited in scope in this respect.

It will, of course, be understood that, although particular embodiments have just been described, the invention is not limited in scope to a particular embodiment or implementation. For example, one embodiment may be in hardware, whereas another embodiment may be in software. Likewise, an embodiment may be in firmware, or any combination of hardware, software, or firmware, for example. For example, a system may include a multicolor display and a computing platform coupled to the display, where the computing platform, through hardware, software, firmware or any combination therefore, is able to adjust the color balance of the display, such as previously described, for example. Likewise, although the invention is not limited in scope in this respect, one embodiment may comprise an article, such as a storage medium. Such a storage medium, such as, for example, a CD-ROM, or a disk, may have stored thereon instructions, which when executed by a system, such as a host computer or computing system or platform, or an imaging system, may result in or execute a method of color balancing a multicolor display in accordance with the invention, such as, for example, one of the embodiments previously described.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method of adjusting the color balance of a display comprising:

modulating two selected colors so that at some point during the modulation the two colors appear substantially the same on the display;

adjusting the modulation to change the point at which the colors appear substantially the same; and modifying the color balance of the display based, at least in part, on a measurement of the modulation adjustment.

2. The method of claim 1, wherein modulating the two selected colors comprises modulating the luminance and/or chromaticity of the two selected colors.

3. The method of claim 2, wherein modulating the luminance and/or chromaticity of the two selected colors comprises modulating the luminance.

4. The method of claim 1, wherein modulating the two selected colors comprises modulating the two selected colors periodically.

5. A method of adjusting the color balance of a display comprising:
modulating the luminance and/or chromaticity of a color from the color space of the display;
modulating the luminance and/or chromaticity of a color from a reference color space, wherein the applied modulation over time of the two colors being mirror images with respect to each other;
adjusting the modulation so that the colors appear substantially the same at a selected point during the modulation of both colors; and
modifying the color balance of the display based, at least in part, on a measurement of the modulation adjustment.

6. The method of claim 5, wherein the reference color space comprises a color space that substantially covers the color gamut of human vision.

7. The method of claim 6, wherein the reference color space comprises a color shifted version of the 1976 CIE color space.

8. The method of claim 5, wherein modulating the luminance and/or chromaticity of the two colors comprises modulating the luminance.

9. The method of claim 8, wherein modulating the luminance of the two colors comprises periodically modulating the luminance.

10. The method of claim 9, wherein periodically modulating the luminance of the two colors comprises sinusoidally modulating the luminance.

11. The method of claim 10, wherein adjusting the modulation so that the colors appear substantially the same at a selected point during the modulation of both colors comprises adjusting the modulation so that the colors appear substantially the same at the midpoint of the modulation.

12. The method of claim 11, wherein the reference color space comprises a color space that substantially covers the color gamut of human vision.

13. The method of claim 12, wherein both colors are selected from extended color space.

14. The method of claim 5, wherein adjusting the modulation so that the colors appear substantially the same at a selected point during the modulation of both colors comprises adjusting the modulation so that the colors appear substantially the same at the midpoint of the modulation.

15. The method of claim 5, wherein both colors are selected from extended color space.

16. The method of claim 5, wherein the multicolor display comprises a multicolor polymer emissive display.

17. The method of claim 16, wherein the multicolor polymer emissive display comprises a five-color polymer emissive display.

18. A system comprising:
a multicolor display;
a computing platform coupled to the display, said computing platform in operation, being able to adjust the color balance of the multicolor display by:
modulating the luminance and/or chromaticity of a color from the color space of the multicolor display;
modulating the luminance and/or chromaticity of a color from reference color space, wherein the applied modulation over time of the two colors being mirror images with respect to each other;
adjusting the modulation so that the colors appear substantially the same at a selected point during the modulation of both colors; and
modifying the color balance of the multicolor display based, at least in part, on a measurement of the modulation adjustment.

19. The system of claim 18, wherein the reference color space comprises a color space that substantially covers the color gamut of human vision.

20. The system of claim 18, wherein, during system operation, both colors are selected from extended color space.

21. The system of claim 18, wherein the multicolor display comprises a multicolor polymer emissive display.

22. The system of claim 21, wherein the multicolor polymer emissive display comprises a five-color polymer emissive display.

23. An article comprising: a storage medium;
said storage medium having stored thereon instructions, said instructions, when executed by a computing platform coupled to a multicolor display, resulting in:
modulating the luminance and/or chromaticity of a color from the color space of the multicolor display;
modulating the luminance and/or chromaticity of a color from reference color space, wherein the applied luminance modulation over time of the two colors being mirror images with respect to each other;
adjusting the modulation so that the colors appear substantially the same at a selected point during the modulation of both colors; and
modifying the color balance of the multicolor display based, at least in part, on a measurement of the modulation adjustment.

24. The article of claim 23, wherein the reference color space comprises a color space that substantially covers the color gamut of human vision.

25. The article of claim 23, wherein, during platform operation, both colors are selected from extended color space.

26. The article of claim 23, wherein said article has stored thereon instructions to be executed by a computing platform coupled to a multicolor display, the multicolor display comprising a multicolor polymer emissive display.

27. The article of claim 23, wherein said article has stored thereon instructions to be executed by a computing platform coupled to a multicolor polymer emissive display, the multicolor polymer emissive display comprising a five-color polymer emissive display.

* * * * *